June 21, 1938.  C. L. CLAFF  2,121,185
CANDY
Original Filed Nov. 26, 1935
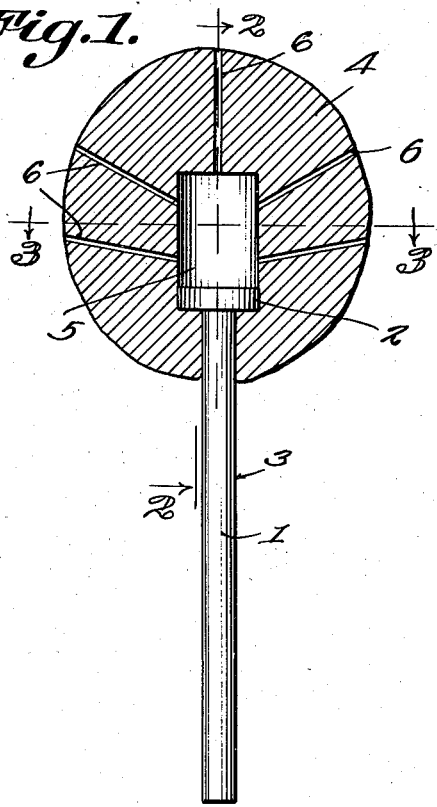
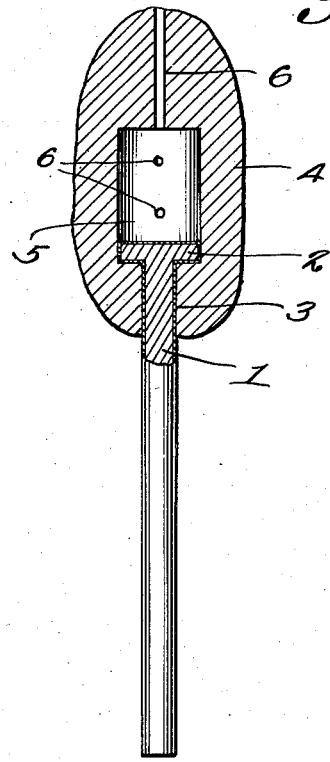
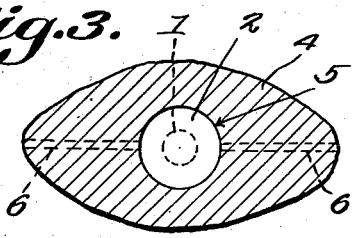
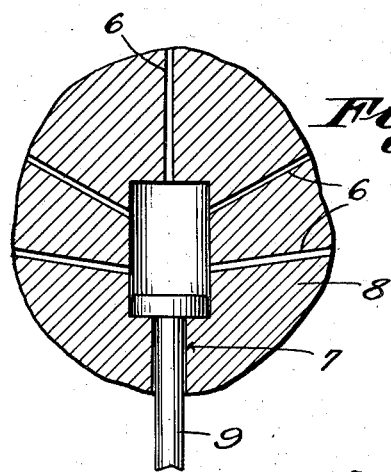
Inventor
C. L. Claff
By C. A. Snow & Co.
Attorneys.

Patented June 21, 1938

2,121,185

UNITED STATES PATENT OFFICE 2,121,185

CANDY

Clarence Lloyd Claff, Randolph, Mass.

Application November 26, 1935, Serial No. 51,721
Renewed February 19, 1936

6 Claims. (Cl. 99—138)

This invention relates to an article of manufacture in the nature of a candy product of that type generally known as a "sucker". These articles comprise large pieces of hard candy fixedly mounted on stems of wood or other suitable material.

An object of the invention is to increase the enjoyment derived from the use of an article of this kind by providing a means whereby a syrupy fluid can be produced within and expelled from the candy while it is in use.

Another object is to provide the added attraction of allowing the user to reciprocate the stem relative to the candy thereon so as to produce tangible results in the form of a sweeter saliva than would be obtainable by the ordinary act of sucking the candy.

A further object is to provide a candy which can be produced readily and which can be profitably sold at the same price as the ordinary candies of this type.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing—

Figure 1 is a longitudinal section through the candy, the stem therein being in elevation.

Figure 2 is a section on line 2—2, Figure 1.

Figure 3 is a section on line 3—3, Figure 1.

Figure 4 is a view similar to Figure 1 showing a slightly modified structure.

Referring to the figures by characters of reference, 1 designates a stem of wood or any other suitable material having a head 2 at one end. This stem and the head are impregnated or coated with paraffin 3 or other tasteless material which will prevent it from adhering to hard candy when applied thereto. In the structure shown the candy portion 4 of the article houses the head 2 and a portion of the stem 1 and has a cavity 5 from which radiate a desired number of openings 6. The cavity is large enough to allow the head 2 to reciprocate therein and may vary in size and shape.

When the article is delivered to the customer the head will be in firm engagement with the stem but after the candy has been placed in the mouth it soon becomes possible to move the stem back and forth relative to the candy and while the two parts will long remain anchored to each other, the relative motion will produce a pumping effect, drawing saliva through the openings 6 into cavity 5 and then expelling it back into the mouth. Obviously this results in the production of a highly sweetened syrupy fluid which is more satisfying to the user than where the sugar can be removed from the outer surface only of the candy.

Instead of coating or impregnating the stem with a substance like paraffin to prevent the candy from sticking to it, the stem and head can be spaced in any suitable manner from the candy at the time of manufacture so that a clearance 7 will be left between the candy 8 and the stem 9 as shown in Figure 4.

What is claimed is:

1. As an article of manufacture a piece of hard candy having a cavity with an outlet opening, and a stem movable in the cavity.

2. As an article of manufacture a piece of hard candy having a cavity with an outlet opening, a stem movable in and projecting from the candy, and means on the stem and in the cavity for preventing separation of the candy from the stem.

3. As an article of manufacture a piece of hard candy having a cavity with an outlet opening, and a stem having a head movable in the cavity.

4. As an article of manufacture a piece of hard candy having a cavity and an unobstructed opening extending therefrom, and pumping means communicating with the cavity in the candy.

5. As an article of manufacture a piece of hard candy having a cavity and an unobstructed opening extending therefrom, pumping means mounted in the cavity, and means for preventing the candy from sticking to the pumping means.

6. As an article of manufacture a piece of hard candy having a cavity with an outlet opening, a stem having a head movable in the cavity, and means on the stem and head for preventing the candy from sticking thereto.

CLARENCE LLOYD CLAFF.